Oct. 16, 1945.  J. L. NICKERSON  2,386,878
APPARATUS FOR DETERMINING BLOOD VOLUME
Filed Jan. 19, 1944   2 Sheets-Sheet 1
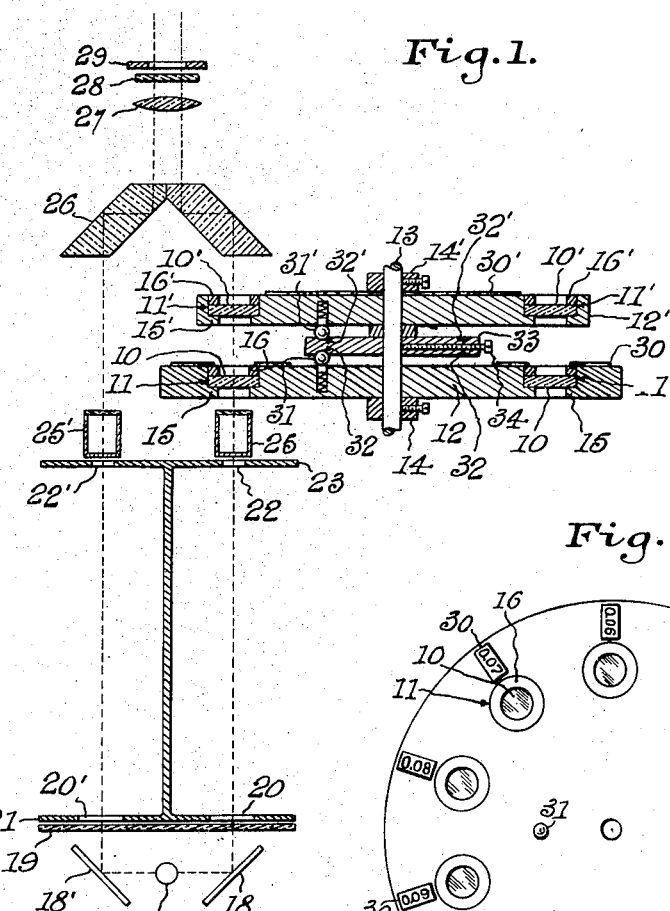
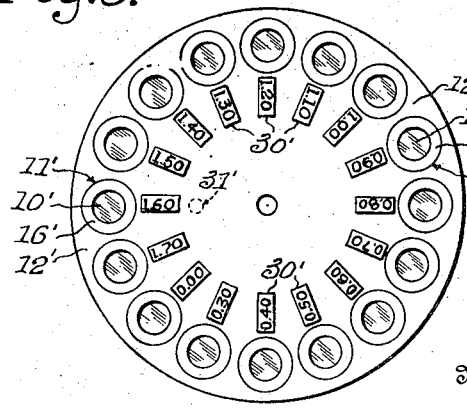
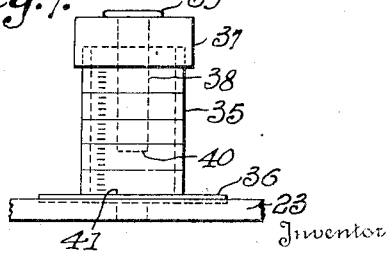
Inventor
John L. Nickerson
By
Attorneys Oct. 16, 1945.  J. L. NICKERSON  2,386,878
APPARATUS FOR DETERMINING BLOOD VOLUME
Filed Jan. 19, 1944  2 Sheets-Sheet 2
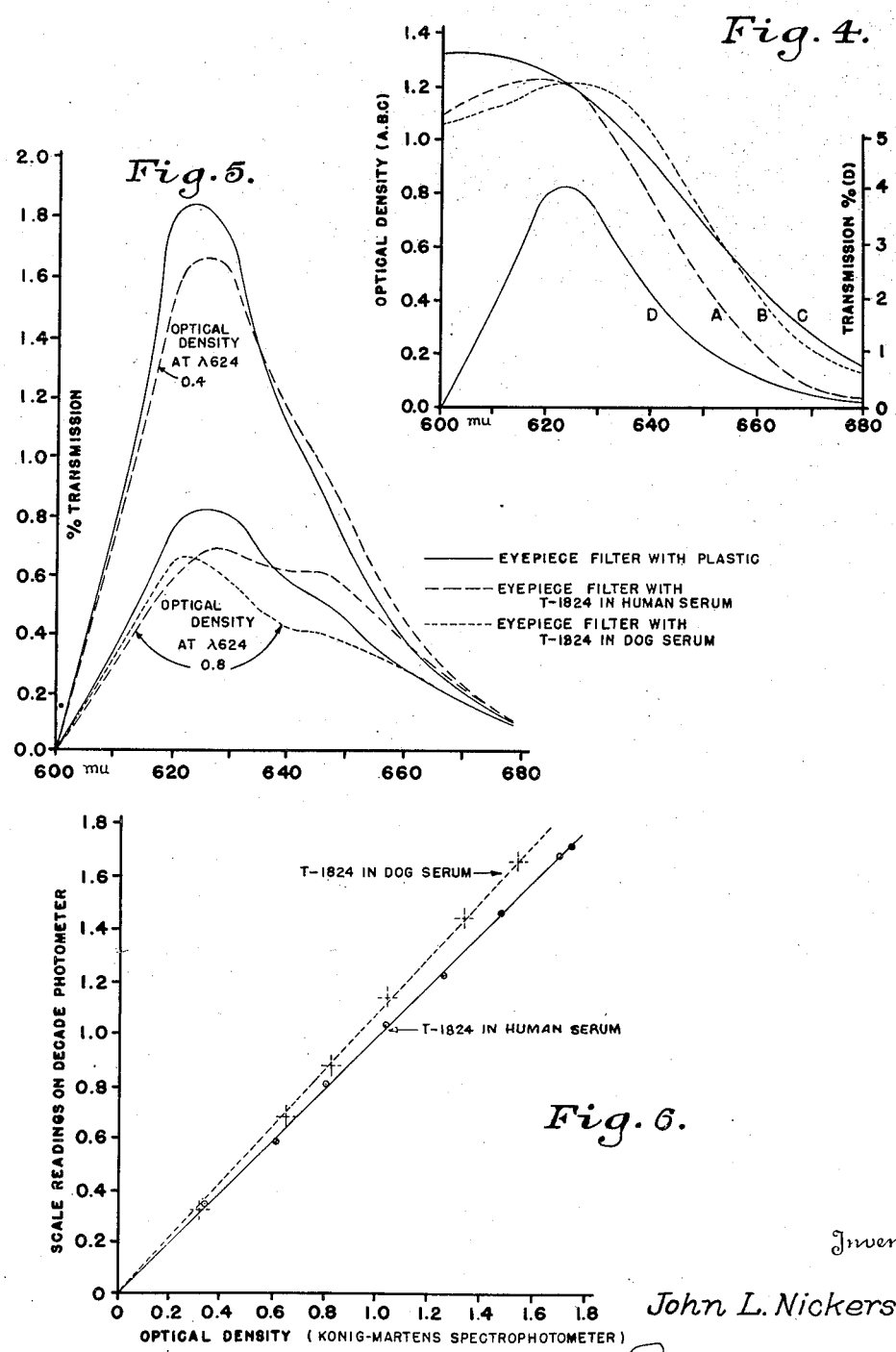

Patented Oct. 16, 1945

2,386,878

UNITED STATES PATENT OFFICE 2,386,878

APPARATUS FOR DETERMINING BLOOD VOLUME

John Lester Nickerson, New York, N. Y., assignor to United States of America, as represented by the Secretary of War Application January 19, 1944, Serial No. 518,911

7 Claims. (Cl. 88—14)

This invention relates generally to photometry but more particularly to an instrument for determining blood volume.

One object of the invention is to provide a device by which a laboratory technician can easily and rapidly match the two fields of a photometer with respect to the control and dye tinted specimens and by direct reading obtain numerical values for the measurement of densities of such specimens.

Another object of the invention is to provide a photometer including relatively adjustable series of filters having graduated optical densities by which the portion of the matching field, transmitting rays through the control medium, instead of being continuously variable, is changed in a series of individually distinct steps.

Another object of the invention is to provide an instrument for measuring plasma concentration which combines the features of portability, ruggedness, simplicity of operation, and accuracy, which make it suitable for either field work in the military service or laboratory work in a base hospital.

Still another object of the invention is to provide a photometer in which both halves of the optical field have the same tint so that no confusion as to color arises in matching intensities.

With these and other objects in view, this invention consists in certain novel details of construction, combination and arrangement of parts to be more particularly hereinafter described and claimed.

Referring to the drawings, in which like parts are indicated by similar reference characters:

Figure 1 is a diagrammatic view showing the alignment of the various parts of the photometer;

Figure 2 is a top plan view of a rotatable filter disc provided with filters ranging in densities represented in hundredths from 0.00 to 0.09 inclusive;

Figure 3 is a top plan view of a rotatable filter disc provided with filters ranging in densities represented in tenths from 0.00 to 1.70;

Figure 4 is a chart showing spectral absorption curves;

Figure 5 is a chart showing curves which represent transmission of the eyepiece filter with plastic, human serum, and dog serum for various wave lengths with T-1824 dye in serums;

Figure 6 is a chart showing curves which represent the relationship between the scale reading of the instant photometer and the optical density scale reading of the Konig-Martens spectrophotometer; and Figure 7 is an elevation of a serum cell showing details of construction of the container and stopper.

The instrument described herein was designed to meet the field requirements for the determination of blood volume by the procedure developed by Dr. Gregersen and in which the optical density of the blue azo dye, designated as T-1824, is used.

Briefly stated, the procedure may be outlined as follows:

If the patient has lost a substantial amount of blood, the plasma injection should be equal to that lost. Too large an injection is as bad for the patient as not enough. Hence, the problem to be solved, insofar as this invention is concerned, is how much plasma has the patient lost.

By this method a known amount of blood is first withdrawn from the patient and a definite amount of dye injected, which diffuses through the blood stream in 5 to 10 minutes. Then another definite amount of blood is withdrawn, the plasma is separated from the dyed and undyed samples and equal thicknesses of the two samples are compared colorimetrically to determine the amount of blood plasma lost. In order to facilitate the above-outlined procedure, particularly with respect to the operations of field units where speed of manipulation, accuracy, portability, and durability of apparatus are required, the instrument for comparison of the density of the dyed and normal blood plasma was devised.

The instrument consists primarily of a light source adapted to direct two beams through equal thicknesses of two samples, one of which contains a definite amount of dye and the other being free of dye. The two beams of light pass to a single two-field matching filter eyepiece where one-half of the circular field is illuminated by one beam and the other half by the other beam. By this arrangement the difference in the illumination on the two halves of the field is due solely to the light absorption by the dye, the plasma in the two samples making equal change in each half of the filter.

The instrument is provided with a system of light-absorbing elements adapted to be moved into the path of the beam passing through the undyed sample. For this purpose a material, the light absorbing characteristics of which are the same as the dye, is employed, and therefore plastic filters formed as strips or discs, which for a given range of the light spectrum have the same characteristics as the dye, are used.

To increase the speed and facilitate ease of operation of the instrument coaxial rotatable discs are provided. Within these discs are arranged a number of the aforesaid plastic slabs which are mounted adjacent the periphery thereof, so that they may be readily moved into the path of the beam which passes through the undyed sample. The slabs are ground to a definite graduated thickness so that the rotation of one disc will introduce into the path of the beam slabs calibrated in thicknesses of say 1 to 10, and the other disc will introduce into the beam slabs calibrated in thicknesses of say .1 to 1. By turning the discs or wheels to introduce filters into the path of the beam, the combined densities of which are sufficient to cause the same absorption as the dye, the two fields can accurately be matched, for the particular band of light spectrum, when viewed through the proper filter, and by calibrating the slabs by direct reference to a table, the exact amount of plasma lost can be immediately determined.

The instruments ordinarily used in measuring the plasma dye-concentration (e. g. the visual or photoelectric spectrophotometers, neutral wedge photometers, and various types of photoelectric colorimeters) are satisfactory for laboratory purposes, but none of them combine the features of portability, ruggedness, simplicity of operation and accuracy which would make them suitable for field use.

In order to simplify the plasma dye determination and to eliminate some of the difficulties encountered with other instruments, a portable photometer was designed in which the matching field, instead of being continuously variable is changed in a series of discrete and suitably related steps, as mentioned above.

The basis of the device, as set forth briefly above, consists in a series of colored plastic filters preferably formed as discs which are designated by the numerals 10 and 10' in Figures 1, 2 and 3. These disc-shaped filters are arranged in two groups in circular openings 11 and 11' in the discs 12 and 12' which are rotatably mounted on a shaft 13, and retained thereon by the collars 14 and 14'.

The openings 11 and 11' in the discs 12 and 12' are stepped so as to form ledges 15 and 15' to support the circular filters which are held in place by rings 16 and 16', that may be glued or otherwise suitably attached to the internal circumference of the upper portion of the openings. The shaft 13 is supported within a casing (not shown) which may be designed to house practically the entire device.

The groups of filters 10 and 10' which are located respectively in the discs 12 and 12' are arranged in the order of their optical densities which increase in hundredths, from 0.00 to 0.09, in disc 12; and in tenths, from 0.30 to 1.70, in disc 12'.

Combinations of these filters in pairs, one filter for each group, makes it possible to determine optical densities from 0.30 to 1.70 in steps of 0.01, which is within the limit of intensity discrimination over most of the range.

The arrangement of the apparatus can be understood by examination of Figure 1. Two beams of light from a projection lamp 17 are directed by the mirrors 18, 18' through the ground glass screen 19 and the circular apertures 20 and 20' in plate 21. One of the beams passes through a circular opening 22 in a supporting plate or stage 23, then through a glass cell 25 containing the clear control serum, thence in succession through 10, one of the hundredth, and 10', one of the tenth plastic filters, and finally through a bi-prism 26 and a lens 27 to one-half of the field of filter 28 of the eyepiece 29. The other beam passes through the opening 22' in plate 23, glass cell 25' of the same optical length as 25 and filled with the dye-laden serum sample and then via the bi-prism 26, through lens 27 to the other half of the field of filter 28 of the eyepiece. If the basic unpigmented plastic has some residual color, it may be necessary to insert in the second beam two blocks of this material equal in thickness to the two filters of plastic in the first beam. With the particular plastic used here this is not necessary, for its transmission in the visible region of the spectrum is excellent. The eyepiece contains a filter with a transmission peak at 624 millimicrons enabling the intensities of the fields to be compared in a suitable and narrow spectral region.

Further details relating to the construction of the serum containers or cells 25 and 25' are shown in Figure 7.

These cells are tubular in form having a cylindrical body portion 35 which is attached to a circular disc-shaped base 36, the body and the base both being formed of transparent material.

The cylinder or body portion 35 is provided with a top or cover 37 which is drilled centrally to receive a transparent stopper 38. A flange 39 is provided at the upper end of the stopper to limit its projection within the cylinder so that the distance between the bottom surface 40 of the stopper and the upper surface 41 of the disc-shaped base 36 will be equal in all cells when the stoppers are inserted into the covers to their full extent. Graduations on the cylinder may also be used to gauge the distance of insertion of the stopper so that bottom surface 40 thereof may be brought to a predetermined distance from the bottom 41 of the container.

The disc 36 is centered over the circular opening 22 or 22' in the stage 23 by providing the latter with countersunk depressions adjacent the openings 22 and 22' and concentric therewith.

With the construction shown beams from the light source will always pass through an equal thickness of plasma on their paths between the disc and the stopper.

The rapid selection of the pairs of filters is attained by their arrangement on the two coaxial discs 12 and 12' which can be rotated by hand to bring any combination of a hundredth and a tenth density filter into the beam of the instrument. Tabs 30 and 30' marked with the hundredths and tenths are attached to the discs 12 and 12' at the position of the corresponding filters and by their juxtaposition at a convenient viewing point, the total optical density of the pair in the beam is shown as a numerical value, e. g. 1.54, where the pair consist of the 1.5 from the tenth range and the .04 from the hundredth range.

The exact centering of a filter in the beam automatically occurs when ball friction catches 31 and 31' each slip into one of the equally spaced depressions 32 and 32' in a steel plate 33 mounted on the shaft of the discs and retained rigidly thereon by the screw 34. The steel plate or disc 12 used with the hundredth range contains ten equally spaced depressions, and the plate or disc 12' for use with the tenth range has 16 depressions corresponding respectively to the 10 and 16 steps in those groups. The 16 plastic filters 10' of the tenth range comprise 15 tenths, 0.30 to 1.70, inclusive, and a colorless blank, 0.00, which with the corresponding colorless blank of the hundredth range enables the two beams to be initially matched in intensity thus constituting a zero setting. The equalizing of the fields in this situation is made by slight adjustments in the mirrors 18 and 18'. Once this adjustment is obtained it seldom needs to be altered. A common difficulty in matching the fields appears when the halves of the field are not quite the same color. However, if both beams pass through identical materials this situation will not arise. Obviously this is not easy to arrange since one beam traverses the blue dye in serum and the other passes through clear serum and the material of the color filter. One solution of this problem was attempted by constructing the color filters from gelatin films in which the blue dye itself was absorbed. An exact correspondence between the beams was attained. This method was found to be impractical at the present time since filters of this type with exact optical densities could not be readily produced. Another approach could be the use of neutral tint filters, but with these the color differences can be quite disturbing, especially at the higher optical densities. It was found that sheets of a blue colored polymethyl methacrylate have a spectral absorption curve almost identical with that of the dye in serum between 600 and 680 m$\mu$. In Figure 4, curves A, B and C are the spectral absorption curves of samples of T-1824 in human serum, of T-1824 in dog serum and of the plastic respectively adjusted to the same density at 624 m$\mu$. Since the eyepiece filter 28 has a transmission illustrated by curve D it is clear that only light of wave lengths between 600 and 680 m$\mu$ will reach the eye of the observer. In this range the spectral absorption curves A, B and C coincide rather well and this accounts for the fact that there is no perceptible color difference between the light transmitted through the plastic and that transmited through dye-serum samples.

The present transmission of the eyepiece filter 28 in combination with the other materials in the beams is shown in Figure 5. The upper pair of curves indicate that a slight difference in spectral transmission exists between the plastic and the T-1824 in human serum. However, from a practical point of view, this difference produces no color variation between the halves of the field. The equivalence of the areas under these curves is an indication of the equality of total illumination on the fields. Similarly, two of the lower curves in Figure 5 show that the conditions of spectral transmission which provide good color matching and equality of illumination also hold for higher densities.

The matching of color and intensity having been attained, there remained the choice of a suitable numerical scale. The thicknesses of the plastic filters are proportional to the numbers on this scale. Since most spectrophotometers measure optical densities over a narrow spectral band (for the Konig-Martens spectrophotometer this band is 7 m$\mu$ wide), and since the photometer herein described has a transmission band 80 m$\mu$ wide, the two types of instrument do not transmit identical spectra. However, it is possible to adjust the plastic thicknesses for matching with T-1824 in human serum to a scale which gives optical densities as measured in a Konig-Martens spectrophotometer. In Figure 6 the continuous line at 45° to the axes is the line of exact correspondence of the scales. The circled points are samples experimentally determined on both instruments. The coincidence of the points along the line demonstrates that the scale of the instrument is linear.

The dotted line in Figure 4 is for T-1824 in dog serum. The linearity is still excellent, but the subject photometer scale readings must be multiplied by 0.915 to provide the value as optical density at 624 m$\mu$. Examination of the dotted curve in Figure 4 shows that the transmission in the subject photometer is lower for T-1824 in dog serum than for T-1824 in human serum, although both have the same transmission in a narrow spectral band at 624 m$\mu$. This difference in transmission accounts for the matching of the dye-dog serum with denser plastics (higher scale readings) than the dye-human serum. Preliminary tests have shown that the scale of the instrument is also linear for T-1824 in cat and rabbit serum. Since the scale of the instant photometer is linear and essentially arbitrary, the instrument is suitable for independent calibration. Solutions of the dye in appropriate sera can be made up in accurate dilutions and read in 10 mm. cells. With these standardizations the dilution of subsequent samples may be computed from the scale readings.

The color stability of blue plastic material is extremely high with the appearance of fading only after several months' exposure to summer sunlight. Since the component of sunlight responsible for this fading is the ultraviolet, it is apparent that the low intensity of ultraviolet light from an incandescent lamp, the efficient filtering action of the ground glass diffusing screen, and suitable shielding of the filters from stray light combine to prevent color changes in the plastic.

The plastic was fabricated in sheets of ¼ inch thickness and in several optical densities. Out of these sheets disks of ⅝ inch diameter were cut and the optical densities measured on a Konig-Martens spectrophotometer at 624 m$\mu$, the peak of the absorption curve of the dye T-1824. From the thickness and optical density it was possible to compute the depth of plastic required to provide the exact density required in each of the filters. The disks were cut down in a lathe to about .002 inch greater than the computed thickness and then rubbed down to the exact dimension by the successive use of the finest sand paper, tripoli, rouge and finally a dry buffer. This resulted in a brilliantly polished surface with the thickness correct to within .0003 inch. In general, however, it was not necessary to work closer than .001 inch and still limit the variations in optical density to less than .001.

The advantages of this system are several. First, it enables a relatively inexperienced observer to match the two fields of the photometer easily since the discrete steps aid in the judgment; second, the numerical values of the optical densities on human sera are obtained directly; third, the measurements can be made rapidly; fourth, both halves of the field have the same tint so that no confusion as to color arises in the matching of intensities; and fifth, the apparatus can be made compact, portable and rugged, requiring little attention.

In order to describe more specifically the operation of the device, the method for the determination of the blood volume in normal subjects is set forth below.

The condition of the subject, namely, position, activity, and digestion, all influence the plasma volume. Hence it is customary to measure the normal blood volume under reasonable basal conditions. The subject should be in a postabsorptive state and should remain quiet, lying down for at least 15 to 20 minutes before and throughout the determination.

To save time and promote accuracy with respect to the volume of dye injected into the patient, it is preferable to use commerically dispensed ampules containing an exact volume of dye solution of known concentration which greatly simplifies the giving of dye and eliminates all calculations from the determination of plasma volume. These ampules contain exactly 5 cc. of a solution of the dye designated as T-1824 which has been carefully standardized. The concentration (approximately 0.45 per cent in water) has been so adjusted that, when the solution is diluted 1:500 in human plasma or serum and read at 624 mμ in 10 mm. cells against an identical dye-free blank, its optical density is 0.8. Each dye ampule is wrapped in a package containing also a 10 cc. ampule of sterile saline which is needed in transferring the dye solution quantitatively to a syringe, as will be further explained.

With a 10 cc. syringe provided with a 20 or 21 gauge needle, ½ cc. of a sterile saline is drawn up to wet the barrel and expel all air bubbles, leaving the needle as well as the tip of the syringe filled with saline. Being careful to avoid the introduction of air, draw in all of the 5 cc. of dye in the ampule. Follow this with another ½ cc. of saline in order to wash the dye in the needle back into the syringe. Detach the needle and expel any air bubbles that may be present. Do not attempt to rinse the ampule with saline. The amount of dye solution remaining in the ampule has been determined and allowance has been made for this in the filling of the ampule. Tests have shown that the overall error in this method of giving the dye is well within one per cent.

Without stasis collect 4 cc. of blood from the antecubital vein (dye-free sample). Detach the syringe from the needle (leaving the needle in the vein) and empty the blood into a 4 cc. hematocrit tube or 5 cc. serum tube containing 1 mgm. dry heparin to prevent clotting. Cork tube to prevent evaporation.

Through the needle already in the vein inject 5 cc. of the standard T-1824 solution and note the time. Make sure that none of the dye escapes outside the vein. Rinse the syringe several times (3–5) with blood before withdrawing the needle.

Exactly 10 minutes after the dye injection, collect another 4 cc. sample of blood without stasis from the opposite antecubital vein or from the same vein in which the dye was given but peripheral to the site of the dye injection. Transfer this sample to a second 4 cc. hematocrit tube or 5 cc. serum tube containing dry heparin, and cork to prevent evaporation.

Determine the specific gravity of the whole blood with the copper sulfate method (Phillips, Van Slyke, Dole et al., 1943). With a small hand centrifuge make a rapid separation of enough plasma for the dye determination. With some of this determine the specific gravity of the plasma. The relative erythrocyte volume as obtained by the conventional hematocrit method is calculated from the equation:

$$\text{Per cent erythrocytes} = \frac{(\text{blood sp. gr.}) - (\text{plasma sp. gr.})}{1.0971 - (\text{plasma sp. gr.})}$$

in which 1.0971 is the specific gravity of human red cells. Look for evidence of hemolysis in the supernatant plasma in both tubes (see below). The hematocrits and plasma protein values may be obtained also by reference to the charts provided by Phillips, Van Slyke et al. (1943).

Alternative procedure: If a high-speed centrifuge is readily available, the hematocrit may be determined by centrifugation for 30 minutes at 3,000 R. P. M. (radius 15 cm.). Provided the samples are properly taken without stasis, the hematocrits in the dye-free and dye-tinged samples should agree within one division.

Collect about 1 cc. of clear plasma from each blood sample with two narrow tipped pipettes (of the type described above). Transfer each plasma sample directly to the appropriate cell (22 and 22') as shown on the stage of the photometer as illustrated in Figure 1.

View the matching fields of filter 28 through the eyepiece 29 of the photometer and then turn the upper disc or dial 12' clockwise until the field illuminated by rays passing through the undyed specimen or control appears slightly lighter in color than the field illuminated by rays passing through the dye-tinted specimen. Then make a fine adjustment by turning the dial 12 until the two fields match. Record the readings of both dials, the added values of which represent the plasma dye concentration expressed in terms of optical density. From this value the total plasma volume is obtained by simply referring to the table (not shown) which is provided with the photometer.

The total blood volume is calculated from the equation:

$$\text{total blood volume cc.} = \frac{\text{Plasma volume cc.}}{1 - \text{hematocrit}}$$

or obtained from the table relating plasma volume and hematocrit to the total blood volume (not shown).

In case the standard ampules of dye are not available and a different amount of dye is injected, the plasma volume can be calculated from the relation $C_1 \times V_1 = C_2 \times V_2$. Since the concentration of dye is directly proportional to the optical density this may be written $$(D_1 \times 500) V_1 = D_2 \times V_2$$

in which—

$D_1$ = the density of the standard dye solution diluted 1:500 in plasma
$V_1$ = cc. of dye injected
$D_2$ = density of dye in the circulating plasma after mixing has taken place
$V_2$ = plasma volume.

Hence, the plasma volume in cc. $= \dfrac{D_1 \times 500 \times V_1}{D_2}$

The dye solution in the standard ampule has been made up to give a value for $D_1$ of exactly 0.8. Since $V_1$ is also a constant (5 cc.) and $D_2$ is read directly on the photometer—

Plasma volume in cc. $= \dfrac{0.8 \times 500 \times 5}{D_2}$ or simply $\dfrac{2000}{\text{photometer reading}}$ A wide range of plasma volumes (1150 to 6500) can be determined without any change in the procedure outlined above. If, however, the photometer reading exceeds 1.79 (plasma volume less than 1150) read the sample in 5 mm. depth instead of 10, multiply the reading by 2 and proceed as before in calculating the plasma volume. If the reading approaches 0.3 (plasma volume greater than 6500), read the sample in 15 mm. depth and divide the value by 1.5. In this manner the range may be extended to include plasma volumes from 600 cc. up to 10,000 without altering the amount of dye injected.

The dose of T-1824 in the standard 5 cc. ampule is in general adequate for determinations on adults. Unless given several times within a period of a few hours, this amount (approximately 20 mgms.) will not cause visible staining of the subject. For routine determinations on small subjects or on children it is advisable to reduce the dose. This can be done without sacrificing accuracy by reducing concentration of the dye solution rather than the volume injected.

Successful use of the dye method in measuring blood volume depends largely upon a knowledge of its limitations and of the manner in which various conditions and technical errors may invalidate the results obtained. The circumstances under which the measurement is made should in every instance be considered in regard to their possible effects: (1) on the accuracy of the plasma dye determination, (2) on the mixing and disappearance of the dye and (3) on the distribution of the plasma dye concentration.

Having thus described my invention, what I claim as new and wish to secure by Letters Patent is:

1. An apparatus for determining blood volume of a patient by the comparison of dyed and undyed blood specimens comprising a light source, means for directing the rays from said source in parallel vertical beams, transparent cells provided with transparent stoppers, said cells being adapted to contain dyed and undyed plasma specimens and to interpose equal thicknesses of plasma in the path of said beams, supporting means adapted to retain said cells in an upright position in the path of said beams means for converging said beams to adjacent parallel paths, an eyepiece including a collimating lens and a two-field matching filter located in the path of said adjacent beams, a plurality of light absorbing elements of graduated densities circularly arranged in rotatable discs adapted for selectively interposing a combination of said elements in the path of said beam passing through the undyed plasma specimen whereby the density of said specimen plus the added densities of said light absorbing elements may be compared with the density of the dyed plasma specimen by comparing the illumination of the fields of said two-field filter to determine the dye-concentration of said dyed specimen.

2. An apparatus for determining blood volume of a patient by matching dyed and undyed specimens of plasma comprising a light source, means for dividing the rays of said light source into two vertically directed parallel beams, transparent cells for containing the dyed and undyed specimens of plasma, said cells being provided with transparent stoppers adapted to transmit said beams, means for supporting said cells and retaining them in positions to allow said beams to pass longitudinally through said stoppers therein, means for converging said beams to adjacent parallel paths, an eyepiece containing a collimating lens and a two field matching filter, said filter being located within the path of said adjacent beams, rotatable discs mounted intermediate said converging means and said cells, filters of progressively arranged densities circumferentially arranged in said discs, said filters being adapted to intersect the path of one of said beams intermediate the container of undyed plasma and said converging means, whereby the combined density of the cell containing undyed plasma plus the densities of the disc filters may be matched optically with the combined density of the dyed plasma plus its containing cell, by rotating said discs until a combination of said filters effects equal illumination of the fields of said matching filter.

3. An apparatus for determining blood volume of a patient by matching dyed and undyed specimens of plasma comprising a light source, reflecting means for dividing the rays of said light source into two vertically directed parallel beams, transparent cells adapted to contain dyed and undyed specimens of plasma, said cells being provided with transparent stoppers adapted to transmit said beams, means for supporting said cells and retaining them in positions to allow said beams to pass longitudinally through said stoppers therein, means for converging said beams to adjacent parallel paths, an eyepiece containing a collimating lens and a two field matching filter, said filter being located within the path of said adjacent beams, and rotatable discs mounted intermediate said converging means and said cells said discs being provided with filters of progressively arranged densities, said filters being adapted to intersect the path of one of said beams intermediate the container of undyed plasma and said converging means, whereby the combined density of the cell containing undyed plasma plus the densities of the disc filters may be matched optically with the density of the cell containing dyed plasma by rotating said discs until a combination of filters intercepts the beam through said undyed specimen to effect equal illumination of the fields of said matching filter with the beam through said dyed specimen.

4. An apparatus for determining blood volume of a patient by matching dyed and undyed specimens of plasma comprising a light source, means for dividing the rays of said light source into two vertically directed parallel beams, transparent cells for containing the dyed and undyed specimens of plasma, said cells being provided with transparent stoppers adapted to transmit said beams, a stage provided with two openings for supporting said cells and retaining them in positions to allow said beams to pass longitudinally through said stoppers therein, means for converging said beams to adjacent parallel paths, an eyepiece containing a collimating lens and a two field matching filter adapted to transmit light waves within a predetermined wave band, said filter being located within the path of said adjacent beams, and rotatable discs mounted intermediate said converging means and said containers said discs being provided with filters of progressively arranged densities, said filters being adapted to be selectively combined to intersect the path of one of said beams intermediate the container of undyed plasma and said converging means by rotation of said discs, whereby the combined density of the cell of undyed plasma plus the densities of the disc filters may be matched optically with the density of the cell of dyed plasma by obtaining equal illumination of the fields of said matching filter.

5. An apparatus for determining blood volume of a patient by matching dyed and undyed specimens of plasma comprising a light source, means for dividing the rays of said light source into two vertically directed parallel beams, transparent cells for containing the dyed and undyed specimens of plasma, said cells being provided with transparent stoppers adapted to transmit said beams, means comprising a stage for supporting said cells, said stage being provided with circular openings and countersunk depressions surrounding said openings for centering said cells in the path of said beams, means for converging said beams to adjacent parallel paths, an eyepiece containing a collimating lens and a two field matching filter, said filter being located within the path of said adjacent beams, and rotatable discs mounted intermediate said converging means and said containers, said discs being provided with filters of progressively arranged densities adapted to intersect the path of one of said beams intermediate the cell of undyed plasma and said converging means whereby the combined density of the cell of undyed plasma plus the densities of the disc filters may be matched optically with the density of the container of dyed plasma by rotating said discs until equal illumination of the fields of the matching filter is obtained.

6. An apparatus for determining blood volume of a patient by the comparison of the optical densities of dyed and undyed blood specimens comprising a light source, means for directing the rays from said source in parallel vertical beams, transparent cells adapted to contain dyed and undyed plasma specimens, said cells being provided with transparent stoppers adapted to project therein to within equal distances from the bottoms of the cells and thereby enclose equal depths of plasma therein, a horizontal stage provided with countersunk openings adapted to retain said cells in the paths of said beams, means for converging said beams to adjacent parallel paths, an eyepiece including a collimating lens and a two-field matching filter located in the paths of said adjacent beams, rotatably mounted discs, and a plurality of light absorbing elements of graduated densities arranged adjacent to the periphery of said discs, means for retaining said discs at predetermined angles of rotation to align selected combinations of said absorbing elements in the path of said beam passing through the undyed plasma specimen whereby the density of said cell containing said specimen plus the added densities of said light absorbing elements may be matched with the density of the dyed plasma specimen plus its containing cell, by rotating said discs until a combination of light absorbing elements intercepts the beam through said undyed specimen to effect equal illumination of the filter fields.

7. An apparatus for determining blood volume of a patient by the comparison of the optical densities of dyed and undyed blood specimens comprising a light source, means for directing the rays from said source in parallel vertical beams, transparent cells adapted to contain dyed and undyed plasma specimens, means for vertically supporting said cells in the path of said beams, said cells being provided with transparent stoppers adapted to interpose equal thicknesses of plasma in the path of said beams, means for converging said beams to adjacent parallel paths, an eyepiece including a collimating lens and a two-field matching filter located in the path of said adjacent beams, rotatably mounted discs, and means for equalizing the color of said fields, said means comprising a plurality of light absorbing elements formed of blue colored discs of polymethyl methacrylate and of graduated densities, arranged adjacent to the periphery of said discs, means for retaining said discs at predetermined angles of rotation to align selected combinations of said absorbing elements in the path of said beam passing through the undyed plasma specimen whereby the density of said specimen plus the density of the containing cell plus the added densities of said light absorbing elements, may be matched with the density of the dyed plasma specimen plus the density of its containing cell, by rotating said discs until a combination of light absorbing elements intercepts the beam through said undyed specimen to effect equal illumination of the filter fields.

JOHN LESTER NICKERSON.